United States Patent
Duer et al.

(10) Patent No.: US 11,934,333 B2
(45) Date of Patent: *Mar. 19, 2024

(54) STORAGE PROTOCOL EMULATION IN A PERIPHERAL DEVICE

(71) Applicant: MELLANOX TECHNOLOGIES, LTD., Yokneam (IL)

(72) Inventors: Oren Duer, Kohav Yair (IL); Dror Goldenberg, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 241 days.

This patent is subject to a terminal disclaimer.

(21) Appl. No.: 17/211,928

(22) Filed: Mar. 25, 2021

(65) Prior Publication Data
US 2022/0309019 A1    Sep. 29, 2022

(51) Int. Cl.
*G06F 13/42* (2006.01)
*G06F 13/38* (2006.01)
*G06F 13/40* (2006.01)
*H04L 67/1097* (2022.01)

(52) U.S. Cl.
CPC ........ *G06F 13/4221* (2013.01); *G06F 13/385* (2013.01); *G06F 13/4081* (2013.01); *H04L 67/1097* (2013.01)

(58) Field of Classification Search
None
See application file for complete search history.

(56) References Cited

U.S. PATENT DOCUMENTS

| 5,003,465 | A  | 3/1991  | Chisholm et al. |
| 5,463,772 | A  | 10/1995 | Thompson et al. |
| 5,615,404 | A  | 3/1997  | Knoll et al.    |
| 5,768,612 | A  | 6/1998  | Nelson          |
| 5,864,876 | A  | 1/1999  | Rossum et al.   |
| 5,893,166 | A  | 4/1999  | Frank et al.    |
| 5,954,802 | A  | 9/1999  | Griffith        |
| 6,070,219 | A  | 5/2000  | McAlpine et al. |
| 6,226,680 | B1 | 5/2001  | Boucher et al.  |

(Continued)

FOREIGN PATENT DOCUMENTS

| EP | 1657878 A1    | 5/2006 |
| EP | 2463782 A2    | 6/2012 |
| WO | 2010062679 A2 | 6/2010 |

OTHER PUBLICATIONS

Bar-Ilan et al, U.S. Appl. No. 17/234,189, filed Apr. 19, 2021.

(Continued)

*Primary Examiner* — Idriss N Alrobaye
*Assistant Examiner* — Dayton Lewis-Taylor
(74) *Attorney, Agent, or Firm* — KLIGLER & ASSOCIATES PATENT ATTORNEYS LTD (57) ABSTRACT

A peripheral device includes a host interface and processing circuitry. The host interface is configured to communicate with a host over a peripheral bus. The processing circuitry is configured to expose on the peripheral bus a peripheral-bus device that communicates with the host using a bus storage protocol, to receive, using the exposed peripheral-bus device, Input/Output (I/O) transactions that are issued by the host, and to complete the I/O transactions for the host in accordance with a network storage protocol, by running at least part of a host-side protocol stack of the network storage protocol.

30 Claims, 2 Drawing Sheets

(56) References Cited

U.S. PATENT DOCUMENTS

| | | | |
|---|---|---|---|
| 6,321,276 B1 | 11/2001 | Forin | |
| 6,581,130 B1 | 6/2003 | Brinkmann et al. | |
| 6,701,405 B1 | 3/2004 | Adusumilli et al. | |
| 6,766,467 B1 | 7/2004 | Neal et al. | |
| 6,789,143 B2 | 9/2004 | Craddock et al. | |
| 6,901,496 B1 | 5/2005 | Mukund et al. | |
| 6,981,027 B1 | 12/2005 | Gallo et al. | |
| 7,171,484 B1 | 1/2007 | Krause et al. | |
| 7,225,277 B2 | 5/2007 | Johns et al. | |
| 7,263,103 B2 | 8/2007 | Kagan et al. | |
| 7,299,266 B2 | 11/2007 | Boyd et al. | |
| 7,395,364 B2 | 7/2008 | Higuchi et al. | |
| 7,464,198 B2 | 12/2008 | Martinez et al. | |
| 7,475,398 B2 | 1/2009 | Nunoe | |
| 7,548,999 B2 | 6/2009 | Haertel et al. | |
| 7,577,773 B1 | 8/2009 | Gandhi et al. | |
| 7,657,659 B1 | 2/2010 | Lambeth et al. | |
| 7,720,064 B1 | 5/2010 | Rohde | |
| 7,752,417 B2 | 7/2010 | Manczak et al. | |
| 7,809,923 B2 | 10/2010 | Hummel et al. | |
| 7,921,178 B2 | 4/2011 | Haviv | |
| 7,921,237 B1 | 4/2011 | Holland et al. | |
| 7,945,752 B1 | 5/2011 | Miller et al. | |
| 8,001,592 B2 | 8/2011 | Hatakeyama | |
| 8,006,297 B2 | 8/2011 | Johnson et al. | |
| 8,010,763 B2 | 8/2011 | Armstrong et al. | |
| 8,051,212 B2 | 11/2011 | Kagan et al. | |
| 8,103,785 B2 | 1/2012 | Crowley et al. | |
| 8,255,475 B2 | 8/2012 | Kagan et al. | |
| 8,260,980 B2 | 9/2012 | Weber et al. | |
| 8,346,919 B1 | 1/2013 | Eiriksson et al. | |
| 8,447,904 B2 | 5/2013 | Riddoch | |
| 8,504,780 B2 | 8/2013 | Mine et al. | |
| 8,645,663 B2 | 2/2014 | Kagan et al. | |
| 8,745,276 B2 | 6/2014 | Bloch et al. | |
| 8,751,701 B2 | 6/2014 | Shahar et al. | |
| 8,824,492 B2 | 9/2014 | Wang et al. | |
| 8,949,486 B1 | 2/2015 | Kagan et al. | |
| 9,038,073 B2 | 5/2015 | Kohlenz et al. | |
| 9,092,426 B1 | 7/2015 | Bathija et al. | |
| 9,298,723 B1* | 3/2016 | Vincent | G06F 16/183 |
| 9,678,818 B2 | 6/2017 | Raikin et al. | |
| 9,696,942 B2 | 7/2017 | Kagan et al. | |
| 9,727,503 B2 | 8/2017 | Kagan et al. | |
| 9,830,082 B1 | 11/2017 | Srinivasan et al. | |
| 9,904,568 B2 | 2/2018 | Vincent et al. | |
| 10,078,613 B1 | 9/2018 | Ramey | |
| 10,120,832 B2 | 11/2018 | Raindel et al. | |
| 10,135,739 B2 | 11/2018 | Raindel et al. | |
| 10,152,441 B2 | 12/2018 | Liss et al. | |
| 10,162,793 B1 | 12/2018 | Bshara et al. | |
| 10,210,125 B2 | 2/2019 | Burstein | |
| 10,218,645 B2 | 2/2019 | Raindel et al. | |
| 10,423,774 B1 | 4/2019 | Zelenov et al. | |
| 10,382,350 B2 | 8/2019 | Bohrer et al. | |
| 10,657,077 B2 | 5/2020 | Ganor et al. | |
| 10,671,309 B1 | 6/2020 | Glynn | |
| 10,684,973 B2 | 6/2020 | Connor et al. | |
| 10,715,451 B2 | 7/2020 | Raindel et al. | |
| 10,824,469 B2 | 11/2020 | Hirshberg et al. | |
| 10,841,243 B2 | 11/2020 | Levi et al. | |
| 10,999,364 B1 | 5/2021 | Itigin et al. | |
| 11,003,607 B2 | 5/2021 | Ganor et al. | |
| 11,086,713 B1 | 8/2021 | Sapuntzakis et al. | |
| 2002/0152327 A1 | 10/2002 | Kagan et al. | |
| 2003/0023846 A1 | 1/2003 | Krishna et al. | |
| 2003/0046530 A1 | 3/2003 | Poznanovic | |
| 2003/0120836 A1 | 6/2003 | Gordon | |
| 2004/0010612 A1 | 1/2004 | Pandya | |
| 2004/0039940 A1 | 2/2004 | Cox et al. | |
| 2004/0057434 A1 | 3/2004 | Poon et al. | |
| 2004/0158710 A1 | 8/2004 | Buer et al. | |
| 2004/0221128 A1 | 11/2004 | Beecroft et al. | |
| 2004/0230979 A1 | 11/2004 | Beecroft et al. | |
| 2005/0102497 A1 | 5/2005 | Buer | |
| 2005/0198412 A1 | 9/2005 | Pedersen et al. | |
| 2005/0216552 A1 | 9/2005 | Fineberg et al. | |
| 2006/0095754 A1 | 5/2006 | Hyder et al. | |
| 2006/0104308 A1 | 5/2006 | Pinkerton et al. | |
| 2006/0259291 A1 | 11/2006 | Dunham et al. | |
| 2006/0259661 A1 | 11/2006 | Feng et al. | |
| 2007/0011429 A1 | 1/2007 | Sangili et al. | |
| 2007/0061492 A1 | 3/2007 | Van Riel | |
| 2007/0223472 A1 | 9/2007 | Tachibana et al. | |
| 2007/0226450 A1 | 9/2007 | Engbersen et al. | |
| 2007/0283124 A1 | 12/2007 | Menczak et al. | |
| 2007/0297453 A1 | 12/2007 | Niinomi | |
| 2008/0005387 A1 | 1/2008 | Mutaguchi | |
| 2008/0147822 A1 | 6/2008 | Benhase et al. | |
| 2008/0147904 A1 | 6/2008 | Freimuth et al. | |
| 2008/0168479 A1 | 7/2008 | Purtell et al. | |
| 2008/0313364 A1 | 12/2008 | Flynn et al. | |
| 2009/0086736 A1 | 4/2009 | Foong et al. | |
| 2009/0106771 A1 | 4/2009 | Benner et al. | |
| 2009/0204650 A1 | 8/2009 | Wong et al. | |
| 2009/0319775 A1 | 12/2009 | Buer et al. | |
| 2009/0328170 A1 | 12/2009 | Williams et al. | |
| 2010/0030975 A1 | 2/2010 | Murray et al. | |
| 2010/0095053 A1 | 4/2010 | Bruce et al. | |
| 2010/0095085 A1 | 4/2010 | Hummel et al. | |
| 2010/0211834 A1 | 8/2010 | Asnaashari et al. | |
| 2010/0217916 A1 | 8/2010 | Gao et al. | |
| 2010/0228962 A1 | 9/2010 | Simon et al. | |
| 2010/0322265 A1 | 12/2010 | Gopinath et al. | |
| 2011/0023027 A1 | 1/2011 | Kegel et al. | |
| 2011/0119673 A1 | 5/2011 | Bloch et al. | |
| 2011/0213854 A1 | 9/2011 | Haviv | |
| 2011/0246597 A1 | 10/2011 | Swanson et al. | |
| 2012/0314709 A1 | 12/2012 | Post et al. | |
| 2013/0067193 A1 | 3/2013 | Kagan et al. | |
| 2013/0080651 A1 | 3/2013 | Pope et al. | |
| 2013/0103777 A1 | 4/2013 | Kagan et al. | |
| 2013/0125125 A1 | 5/2013 | Karino et al. | |
| 2013/0142205 A1 | 6/2013 | Munoz | |
| 2013/0145035 A1 | 6/2013 | Pope et al. | |
| 2013/0159568 A1* | 6/2013 | Shahar | H04L 49/901 710/54 |
| 2013/0263247 A1 | 10/2013 | Jungck et al. | |
| 2013/0276133 A1 | 10/2013 | Hodges et al. | |
| 2013/0311746 A1 | 11/2013 | Raindel et al. | |
| 2013/0325998 A1 | 12/2013 | Hormuth et al. | |
| 2013/0329557 A1 | 12/2013 | Petry | |
| 2013/0347110 A1 | 12/2013 | Dalal | |
| 2014/0089450 A1 | 3/2014 | Raindel et al. | |
| 2014/0089451 A1 | 3/2014 | Eran et al. | |
| 2014/0089631 A1 | 3/2014 | King | |
| 2014/0122828 A1 | 5/2014 | Kagan et al. | |
| 2014/0129741 A1 | 5/2014 | Shahar et al. | |
| 2014/0156894 A1* | 6/2014 | Tsirkin | G06F 13/24 710/260 |
| 2014/0181365 A1 | 6/2014 | Fanning et al. | |
| 2014/0185616 A1 | 7/2014 | Bloch et al. | |
| 2014/0254593 A1 | 9/2014 | Mital et al. | |
| 2014/0282050 A1 | 9/2014 | Quinn et al. | |
| 2014/0282561 A1 | 9/2014 | Holt et al. | |
| 2015/0006663 A1 | 1/2015 | Huang | |
| 2015/0012735 A1 | 1/2015 | Tamir et al. | |
| 2015/0032835 A1 | 1/2015 | Sharp et al. | |
| 2015/0081947 A1 | 3/2015 | Vucinic et al. | |
| 2015/0100962 A1 | 4/2015 | Morita et al. | |
| 2015/0288624 A1 | 10/2015 | Raindel et al. | |
| 2015/0319243 A1* | 11/2015 | Hussain | G06F 3/0689 709/217 |
| 2015/0347185 A1 | 12/2015 | Holt et al. | |
| 2015/0355938 A1 | 12/2015 | Jokinen et al. | |
| 2016/0065659 A1 | 3/2016 | Bloch et al. | |
| 2016/0085718 A1 | 3/2016 | Huang | |
| 2016/0132329 A1 | 5/2016 | Gupte et al. | |
| 2016/0226822 A1 | 8/2016 | Zhang et al. | |
| 2016/0342547 A1 | 11/2016 | Liss et al. | |
| 2016/0350151 A1 | 12/2016 | Zou et al. | |
| 2016/0378529 A1 | 12/2016 | Wen | |
| 2017/0075855 A1 | 3/2017 | Sajeepa et al. | |
| 2017/0104828 A1 | 4/2017 | Brown et al. | |

(56) References Cited

U.S. PATENT DOCUMENTS

| | | |
|---|---|---|
| 2017/0180273 A1 | 6/2017 | Daly et al. |
| 2017/0187629 A1 | 6/2017 | Shalev et al. |
| 2017/0237672 A1 | 8/2017 | Dalal |
| 2017/0264622 A1 | 9/2017 | Cooper et al. |
| 2017/0286157 A1 | 10/2017 | Hasting et al. |
| 2017/0371835 A1 | 12/2017 | Ranadive et al. |
| 2018/0004954 A1 | 1/2018 | Liguori et al. |
| 2018/0067893 A1 | 3/2018 | Raindel et al. |
| 2018/0109471 A1 | 4/2018 | Chang et al. |
| 2018/0114013 A1 | 4/2018 | Sood et al. |
| 2018/0167364 A1 | 6/2018 | Dong et al. |
| 2018/0210751 A1 | 7/2018 | Pepus et al. |
| 2018/0219770 A1 | 8/2018 | Wu et al. |
| 2018/0219772 A1 | 8/2018 | Koster et al. |
| 2018/0246768 A1 | 8/2018 | Palermo et al. |
| 2018/0262468 A1 | 9/2018 | Kumar et al. |
| 2018/0285288 A1 | 10/2018 | Bernat et al. |
| 2018/0329828 A1 | 11/2018 | Apfelbaum et al. |
| 2019/0012350 A1 | 1/2019 | Sindhu et al. |
| 2019/0026157 A1 | 1/2019 | Suzuki et al. |
| 2019/0116127 A1 | 4/2019 | Pismenny et al. |
| 2019/0163364 A1 | 5/2019 | Gibb et al. |
| 2019/0173846 A1 | 6/2019 | Patterson et al. |
| 2019/0190892 A1 | 6/2019 | Menachem et al. |
| 2019/0199690 A1* | 6/2019 | Klein ................. H04L 63/0428 |
| 2019/0243781 A1 | 8/2019 | Thyamagondlu et al. |
| 2019/0250938 A1 | 8/2019 | Claes et al. |
| 2020/0012604 A1 | 1/2020 | Agarwal |
| 2020/0026656 A1 | 1/2020 | Liao et al. |
| 2020/0065269 A1 | 2/2020 | Balasubramani et al. |
| 2020/0259803 A1 | 8/2020 | Menachem et al. |
| 2020/0314181 A1 | 10/2020 | Eran et al. |
| 2020/0401440 A1 | 12/2020 | Sankaran et al. |
| 2021/0111996 A1 | 4/2021 | Pismenny et al. |
| 2022/0075747 A1 | 3/2022 | Shuler et al. |
| 2022/0100687 A1 | 3/2022 | Sahin et al. |
| 2022/0103629 A1 | 3/2022 | Cherian et al. |

OTHER PUBLICATIONS

U.S. Appl. No. 17/372,466 Office Action dated Feb. 15, 2023.
Shirey., "Internet Security Glossary, Version 2", Request for Comments 4949, pp. 1-365, Aug. 2007.
Information Sciences Institute, "Transmission Control Protocol; DARPA Internet Program Protocol Specification", Request for Comments 793, pp. 1-90, Sep. 1981.
InfiniBand TM Architecture Specification vol. 1, Release 1.3, pp. 1-1842, Mar. 3, 2015.
Stevens., "TCP Slow Start, Congestion Avoidance, Fast Retransmit, and Fast Recovery Algorithms", Request for Comments 2001, pp. 1-6, Jan. 1997.
Netronome Systems, Inc., "Open vSwitch Offload and Acceleration with Agilio® CX SmartNICs", White Paper, pp. 1-7, Mar. 2017.
PCI Express® Base Specification ,Revision 3.0, pp. 1-860, Nov. 10, 2010.
Dierks et al., "The Transport Layer Security (TLS) Protocol Version 1.2", Request for Comments: 5246 , pp. 1-104, Aug. 2008.
Turner et al., "Prohibiting Secure Sockets Layer (SSL) Version 2.0", Request for Comments: 6176, pp. 1-4, Mar. 2011.
Rescorla et al., "The Transport Layer Security (TLS) Protocol Version 1.3", Request for Comments: 8446, pp. 1-160, Aug. 2018.
Comer., "Packet Classification: A Faster, More General Alternative to Demultiplexing", The Internet Protocol Journal, vol. 15, No. 4, pp. 12-22, Dec. 2012.
Salowey et al., "AES Galois Counter Mode (GCM) Cipher Suites for TLS", Request for Comments: 5288, pp. 1-8, Aug. 2008.
Burstein, "Enabling Remote Persistent Memory", SNIA-PM Summit, pp. 1-24, Jan. 24, 2019.
Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing but Net", SNIA—Storage developer conference , pp. 1-30, year 2017.
Microsoft, "Project Brainwave", pp. 1-5, year 2019.
NVM Express Inc., "NVM ExpressTM Base Specification", Revision 1.4, p. 1-403, Jun. 10, 2019.
Pismenny et al., "Autonomous NIC Offloads", submitted for evaluation of the 26th International Conference on Architectural Support for Programming Languages and Operating Systems (ASPLOS '21), p. 1-18, Dec. 13, 2020.
Pismenny et al., U.S. Appl. No. 17/204,968, filed Mar. 18, 2021.
U.S. Appl. No. 16/827,912 Office Action dated Jun. 1, 2021.
Lebeane et al., "Extended Task queuing: Active Messages for Heterogeneous Systems", Proceedings of the International Conference for High Performance Computing, Networking, Storage and Analysis (SC'16), pp. 933-944, Nov. 2016.
NVM Express Inc., "NVM Express over Fabrics," Revision 1.0, pp. 1-49, Jun. 5, 2016.
"Linux kernel enable the IOMMU—input/output memory management unit support", pp. 1-2, Oct. 15, 2007 downloaded from http://www.cyberciti.biz/tips/howto-turn-on-linux-software-iommu-support.html.
Hummel M., "IO Memory Management Hardware Goes Mainstream", AMD Fellow, Computation Products Group, Microsoft WinHEC, pp. 1-7, 2006.
NVM Express, Revision 1.0e, pp. 1-127, Jan. 23, 2014.
InfiniBand Trade Association, "InfiniBandTM Architecture Specification", vol. 1, Release 1.2.1, pp. 1-1727, Nov. 2007.
Shah et al., "Direct Data Placement over Reliable Transports", IETF Network Working Group, RFC 5041, pp. 1-38, Oct. 2007.
Culley et al., "Marker PDU Aligned Framing for TCP Specification", IETF Network Working Group, RFC 5044, pp. 1-75, Oct. 2007.
"MPI: A Message-Passing Interface Standard", Version 2.2, Message Passing Interface Forum, pp. 1-64, Sep. 4, 2009.
Welsh et al., "Incorporating Memory Management into User-Level Network Interfaces", Department of Computer Science, Cornell University, Technical Report TR97-1620, pp. 1-10, Feb. 13, 1997.
Tsirkin et al., "Virtual I/O Device (Virtio) Version 1.1", Committee Specification 01, OASIS, Section 5.11, pp. 156-160, Apr. 11, 2019.
Burstein et al., U.S. Appl. No. 17/189,303, filed Mar. 2, 2021.
Mellanox Technologies, "Understanding On Demand Paging (ODP)," Knowledge Article, pp. 1-6, Feb. 20, 2019 downloaded from https://community.mellanox.com/s/article/understanding-on-demand-paging--odp-x.
Rosenbaum et al., U.S. Appl. No. 17/338,131, filed Jun. 3, 2021.
Microchip Technolohy Incorporated, "Switchtec PAX Gen 4 Advanced Fabric PCIe Switch Family—PM42100, PM42068, PM42052, PM42036, PM42028," Product Brochure, pp. 1-2, year 2021.
Regula, "Using Non-Transparent Bridging in PCI Express Systems," PLX Technology, Inc., pp. 1-31, Jun. 2004.
U.S. Appl. No. 17/372,466 Office Action dated Nov. 2, 2022.
U.S. Appl. No. 17/527,197 Office Action dated Sep. 28, 2023.
U.S. Appl. No. 17/527,197 Notice of allowance dated Dec. 13, 2023.
U.S. Appl. No. 17/979,013 Office Action dated Jan. 29, 2024.

\* cited by examiner

STORAGE PROTOCOL EMULATION IN A PERIPHERAL DEVICE

FIELD OF THE INVENTION

The present invention relates generally to data storage, and particularly to emulation of storage protocols in peripheral devices.

BACKGROUND OF THE INVENTION

Various techniques for data storage using network adapters are known in the art. For example, U.S. Pat. Nos. 9,696,942 and 9,727,503 describe techniques for accessing remote storage devices using a local bus protocol. A disclosed method includes configuring a driver program on a host computer to receive commands in accordance with a protocol defined for accessing local storage devices connected to a peripheral component interface bus of the host computer. When the driver program receives, from an application program running on the host computer a storage access command in accordance with the protocol, specifying a storage transaction, a remote direct memory access (RDMA) operation is performed by a network interface controller (NIC) connected to the host computer so as to execute the storage transaction via a network on a remote storage device.

U.S. Pat. No. 10,657,077 describes a HyperConverged NVMF storage-NIC card. A storage and communication apparatus for plugging into a server, includes a circuit board, a bus interface, a Medium Access Control (MAC) processor, one or more storage devices and at least one Central Processing Unit (CPU). The bus interface is configured to connect the apparatus at least to a processor of the server. The MAC mounted on the circuit board and is configured to connect to a communication network. The storage devices are mounted on the circuit board and are configured to store data. The CPU is mounted on the circuit board and is configured to expose the storage devices both (i) to the processor of the server via the bus interface, and (ii) indirectly to other servers over the communication network.

SUMMARY OF THE INVENTION

An embodiment of the present invention that is described herein provides a peripheral device including a host interface and processing circuitry. The host interface is configured to communicate with a host over a peripheral bus. The processing circuitry is configured to expose on the peripheral bus a peripheral-bus device that communicates with the host using a bus storage protocol, to receive, using the exposed peripheral-bus device, Input/Output (I/O) transactions that are issued by the host, and to complete the I/O transactions for the host in accordance with a network storage protocol, by running at least part of a host-side protocol stack of the network storage protocol.

In some embodiments, in running at least part of the host-side protocol stack, the processing circuitry is configured to isolate the host from control-plane operations of the network storage protocol. In an embodiment, the processing circuitry is configured to complete at least some, or at least part, of the I/O transactions for the host in a local storage. In another embodiment, the peripheral device further includes a network port configured to communicate over a network, and the processing circuitry is configured to complete at least some, or at least part, of the I/O transactions for the host by communicating over the network with a storage system that operates in accordance with the network storage protocol.

In some embodiments, in completing an I/O transaction over the network, the processing circuitry is configured to transfer data directly between a memory of the host and the storage system using zero-copy transfer. In an example embodiment, the processing circuitry is configured to determine one or more addresses for the data in the storage system, and then to transfer the data directly between the one or more addresses and the memory of the host, without intermediate storage of the data in the network adapter.

In a disclosed embodiment, at least one of the bus storage protocol and the network storage protocol is a block storage protocol. In another embodiment, at least one of the bus storage protocol and the network storage protocol is a File-System (FS) protocol. In yet another embodiment, at least one of the bus storage protocol and the network storage protocol is an object storage protocol. In still another embodiment, at least one of the bus storage protocol and the network storage protocol is a Key-Value (KV) protocol.

In an embodiment, in exposing the peripheral-bus device, the processing circuitry is configured to emulate a hot-plug indication, notifying the host that a storage device has connected to the peripheral bus. In some embodiments, the processing circuitry is configured to receive from the host a doorbell indicative of a queue on which the host posted one or more work requests pertaining to an I/O transaction, and to read and execute the one or more work requests so as to complete the I/O transaction. In an example embodiment, the processing circuitry includes hardware that is configured to receive the doorbell and to read the one or more work requests from the queue in response co the doorbell.

In another embodiment, the processing circuitry is configured to issue a Message Signaled Interrupt to the host upon completing an I/O transaction. In a disclosed embodiment, the processing circuitry is configured to communicate with the host via one or more registers exposed on the peripheral bus. In another embodiment, the processing circuitry is further configured to perform one or more of storage virtualization and data manipulation operations.

There is additionally provided, in accordance with an embodiment of the present invention, a method including, in a peripheral device that communicates with a host over a peripheral bus, exposing on the peripheral bus a peripheral-bus device that communicates with the host using a bus storage protocol. Input/Output (I/O) transactions, which are issued by the host, are received in the peripheral device using the exposed peripheral-bus device. The I/O transactions are completed for the host, by the peripheral device, in accordance with a network storage protocol, by running at least part of a host-side protocol stack of the network storage protocol.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved data storage techniques in which a peripheral device provides storage services to a host over a peripheral bus. The host may comprise, for example, a server in a data center. The peripheral may comprise, for example, a high-performance network adapter, sometimes referred to as Data Processing Unit (DPU) or "Smart-NIC". The embodiments described herein refer mainly to a DPU that provides storage services to a host over a Peripheral Component Interconnect express (PCIe) bus. Generally, however, the disclosed techniques are applicable to various other types of peripherals and buses.

In the disclosed embodiments, the peripheral device serves the host using a network storage protocol, e.g., a block storage protocol, a File-System (FS) protocol, an object storage protocol or a Key-Value (KV) storage protocol. In particular, the peripheral device (i) exposes to the host a dedicated PCIe device that emulates a bus storage protocol, and (ii) runs at least part of the host-side protocol stack of the network storage protocol. The peripheral device receives Input/Output (I/O) transactions that are issued by the host, and completes the I/O transactions for the host, in accordance with the network storage protocol, using the internally-run protocol stack.

When using the disclosed techniques, the host is completely isolated from the control plane (also referred to as management plane or orchestration plane) of the storage service. The dedicated PCIe device presents to the host a storage interface, which is by nature more specific and restricted than a network interface. The host's interaction with the storage service is confined to data-plane storage operations, i.e., to exchanging I/O transactions with the dedicated PCIe device. Communication between the host and the dedicated PCIe device is typically implemented using a limited set of commands and virtually no security privileges. Control and management operations relating to storage services, for example login, management of identities, credentials and access privileges and other security-related operations, are carried out between the peripheral device (e.g., DPU) and any relevant (remote and/or local) storage system. The host, and therefore any untrusted software that might run on it, is completely isolated from these operations.

In some embodiments, being exposed only to the bus storage protocol, the host may be unaware of the type of network storage protocol used by the peripheral device. As such, it is even possible for the bus storage protocol and the network storage protocol to be of different types. For example, the dedicated PCIe device receive I/O transactions from the host in accordance with a File-System protocol, and complete the I/O transactions over the network in accordance with an object or Key-Value protocol.

As is evident from the description above, the disclosed architecture provides a high degree of security to the storage service. Isolating the host from the management and control of the storage service is important in many applications and use-cases. One example is a multi-tenant cloud application, in which the host does not always have control over the different applications it runs. Another example is a "bare metal" cloud application, in which a tenant is provided with full access privileges to the host. In such scenarios, the disclosed technique enables a storage provider to provide storage services to the various applications running on the host, in a well-controlled, secure and mutually-isolated manner.

The disclosed technique also improves performance, since the host is offloaded of most, if not all, of the network storage protocol stack. Storage tasks often exhibit unpredictable bursts of computational load, e.g., due to complex operations such as manipulation of metadata structures, garbage collection, data compaction and defragmentation. Some computational tasks that may be carried out by the host, e.g., some High-Performance Computing (HPC) workloads, are sensitive to such variations in computational load. Offloading the host-side protocol stack to a peripheral device is therefore highly advantageous.

Moreover, when using the disclosed techniques, maintenance and administration of the network storage protocol stack (e.g., installation, upgrade and configuration) are performed entirely within the peripheral device (e.g., DPU). No cooperation or awareness is required from the host or the host administrator in performing such actions.

Several example implementations and use-cases of the disclosed techniques are described herein. Complementary techniques, such as zero-copy completion of I/O transactions and special-purpose doorbell mechanisms, are also described.

System Description

Figure 1:
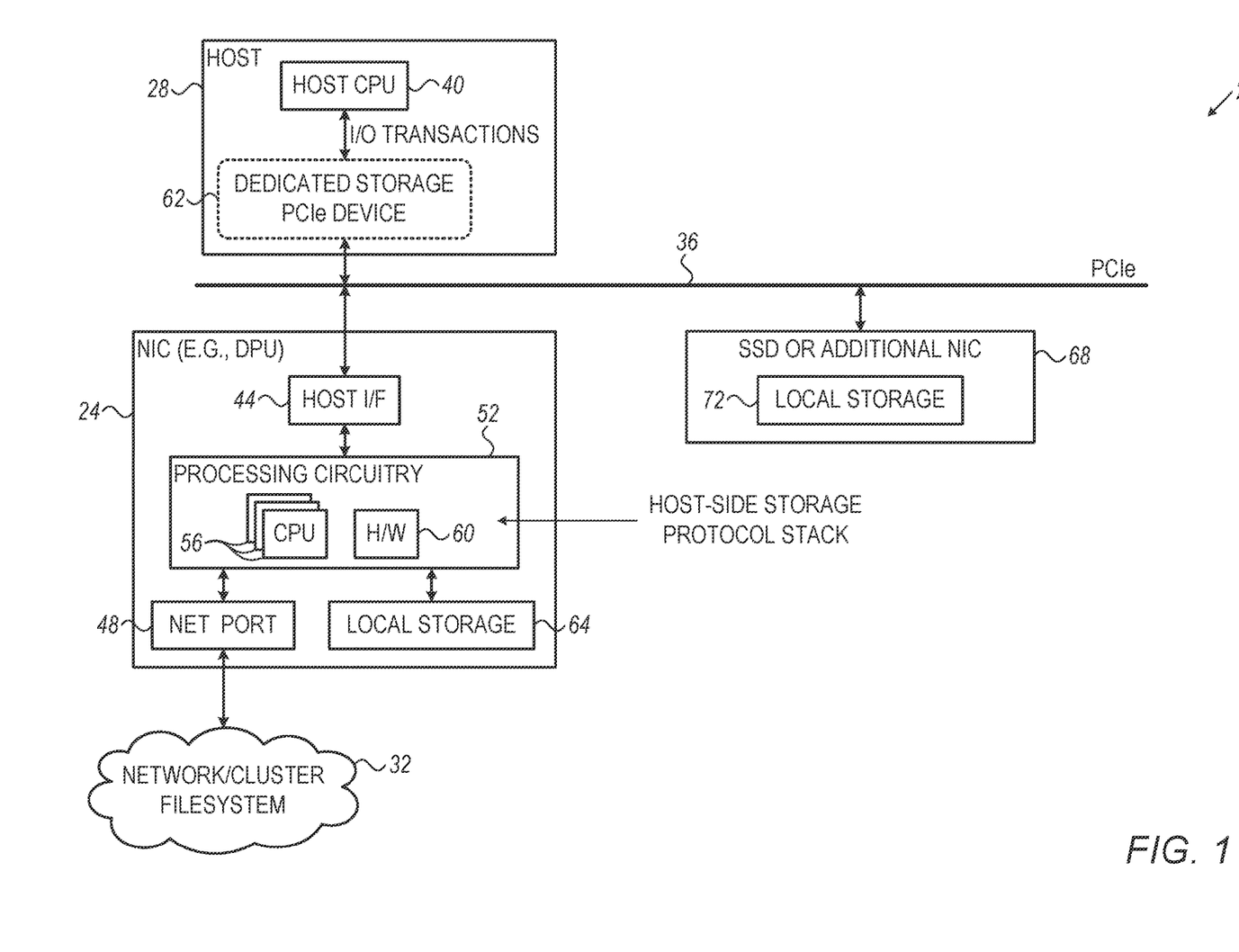
FIG. 1 is a block diagram that schematically illustrates a computing and storage system, in accordance with an embodiment of the present invention.

FIG. 1 is a block diagram that schematically illustrates a computing and storage system 20, in accordance with an embodiment of the present invention. System 20 comprises a high-performance Network Interface Controller (NIC) 24, also referred to as a Data Processing Unit (DPU), which serves a host 28. DPU 24 communicates with host 28 over a peripheral bus, in the present example a Peripheral Component Interconnect express (PCIe) bus 36.

In the present context, DPU 24 is regarded as a peripheral device connected to PCIe bus 36. DPU 24 provides host 28 with data storage services, possibly among other tasks. In the example of FIG. 1, DPU 24 connects host 28 to a network that employs a networked/clustered filesystem (FS) 32. FS 32 operates in accordance with a certain network storage protocol. Non-limiting examples of network storage protocols comprise NFS, NFSoRDMA, SMB, SMB-direct, Lustre, GPFS, BeeGFS, CEPH, as well as proprietary protocols offered by vendors such as VastData and Weka.

Host 28 comprises a host CPU 40 that may run various software applications depending on the applicable use case. In one embodiment, host 40 comprises a server in a cloud-based data center, which hosts applications belonging to multiple customers ("tenants"). In another embodiment, host 40 comprises a server in a "bare metal" data center, in which a tenant "owns" the server, in the sense that the tenant is given full access privileges to the server.

Among other functions, the applications running on host CPU 40 issue Input/Output (I/O) transactions, e.g., transactions that write data to files, read data from files, or create, modify or delete files or directories. Generally, I/O transactions can be issued by any software that runs on host CPU 40, e.g., by Virtual Machines (VMs), processes, containers, or any other software.

In the present example, DPU 24 comprises a host interface 44 for communicating with host 28 over PCIe bus 36, a network port 48 for communicating with FS 32 over the network (e.g., using Ethernet packets), and processing circuitry 52 for carrying out the various networking and storage functions of the DPU. Processing circuitry 52 typically comprises one or more CPUs 56 that run suitable software, and dedicated hardware 60. The tasks of processing circuitry 52 may be partitioned between software (CPUs 56) and hardware (dedicated hardware 60) in any suitable way.

In some embodiments, processing circuitry provides storage services to host CPU 40 by running at least part of the host-side protocol stack of the network storage protocol of FS 32. In addition, processing circuitry 52 exposes to host CPU 40 a dedicated PCIe device 62 on PCIe bus 36. In some embodiments, processing circuitry 52 may perform additional processing that enhances the specified network storage protocol of FS 32. For example, if the network storage protocol does not provide cryptographic capabilities, processing circuitry 52 of DPU 24 may add this functionality on top of the network storage protocol.

For the sake of clarity, PCIe device 62 is depicted in the figure inside host 28, in order to emphasize the interaction between device 62 and host CPU 40. In reality, however, PCIe device 62 is a logical interface presented to host 28 by DPU 24 over bus 36. The terms "PCIe device" and "PCIe interface" can therefore be used interchangeably. PCIe device 62 may comprise a PCIe physical function or virtual function.

PCIe device 62 is configured to emulate a bus storage protocol vis-à-vis the host CPU. Host CPU 40 conducts the I/O transactions by communicating with PCIe device 62 using the bus storage protocol. Processing circuitry 52 of DPU 24 completes (i.e., executes) the I/O transactions for host CPU 40 in FS 32 (and/or in local storage as elaborated below), using the internally-run protocol stack of the network storage protocol. Host interaction with PCIe device 62 may be implemented using standard operating-system (OS) drivers, or as a vendor specific driver, as appropriate.

The protocol between PCIe device 62 and host CPU 40 is typically limited to a small dedicated set of storage-related commands, as opposed to arbitrary communication enabled by conventional network devices. Therefore, the security vulnerability of this protocol is considerably reduced, and the task of securing it is significantly simpler. For example, processing circuitry 56 in DPU 24 may analyze the transactions arriving via PCIe device 62 and apply a security policy that is specified per the storage protocol being used. For example, the security policy may examine attributes relating to the storage protocol (e.g., filenames, offsets, object identifiers and the like) and take actions depending of the attribute values. Actions may comprise, for example, permitting or denying access to certain files or objects, or any other suitable action.

In some embodiments, DPU 24 further comprises local storage 64, e.g., one or more Flash memory devices. In some embodiments, system 20 further comprises an additional peripheral device 68 that comprises local storage 72, e.g., one or more Flash memory devices. The additional peripheral device may be, for example, another NIC (DPU or otherwise) or a Solid State Drive (SSD). In some embodiments, completion of I/O transactions may involve storing data in local storage, e.g., storage 64 in DPU 24 or storage 72 in additional peripheral device 68.

Generally, DPU 24 may complete at least some, or at least part, of the I/O transactions over the network, and may complete at least some, or at least part, of the I/O transactions in the local storage. Thus, for example, the protocol stack running in the DPU may translate a given I/O transaction into multiple storage operations (read or write) of the network storage protocol. One or more of these storage operations may be performed over the network, and one or more of she storage operations may be performed in the local storage.

The configurations of system 20 and its components, e.g., DPU 24 and host 28, shown in FIG. 1, are example configurations that are depicted purely for the sake of conceptual clarity. Any other suitable configurations can be used in alternative embodiments.

For example, in alternative embodiments, the peripheral device that exposes PCIe device 62 and runs the host-side network storage protocol stack may have no network connection at all. In an example embodiment of this sort, the peripheral device is a storage device such as an SSD. In such embodiments, data storage for the host is performed locally with no network communication. Further alternatively, the peripheral device may perform both local storage and remote storage.

Moreover, the disclosed techniques are not limited to file-system protocols, or to any other type of storage protocol. In alternative embodiments, the bus storage protocol may comprise various other types of storage protocols. Example bus storage protocols include block-storage ("block device") protocols such as NVMe, virtio-blk, SCSI, SATA and SAS, various object storage protocols, KV storage protocols such as NVMe-KV, or any other suitable protocol. Alternatively to FS 32, DPU 24 may complete I/O transactions using various network storage protocols, e.g., block-storage protocols such as NVMe-over-Fabrics, NVMe-over-TCP, iSCSI, iSER, SRP and Fibre-channel, object storage protocols such as Amazon S3, Microsoft Azure, OpenStack Swift and Google Cloud Storage, KV storage protocols such as NoSQL, Redis and RocksDB, or any other suitable storage system or protocol.

As noted above, it is not mandatory that the bus storage protocol (exposed toward the host) and the network storage protocol (used for transaction completion) be of the same type. For example, in an embodiment, the bus storage protocol may comprise a FS protocol, while the network storage protocol comprises an object or KV protocol. Any other suitable combination can also be used.

The various elements of system 20 and its components, e.g., DPU 24 and host 28, may be implemented using software, using suitable hardware such as in one or more Application-Specific Integrated Circuits (ASIC) or Field-Programmable Gate Arrays (FPGA), or using a combination of software and hardware elements.

Typically, host CPU 40 and CPUs 56 of DPU 24 comprises programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2:
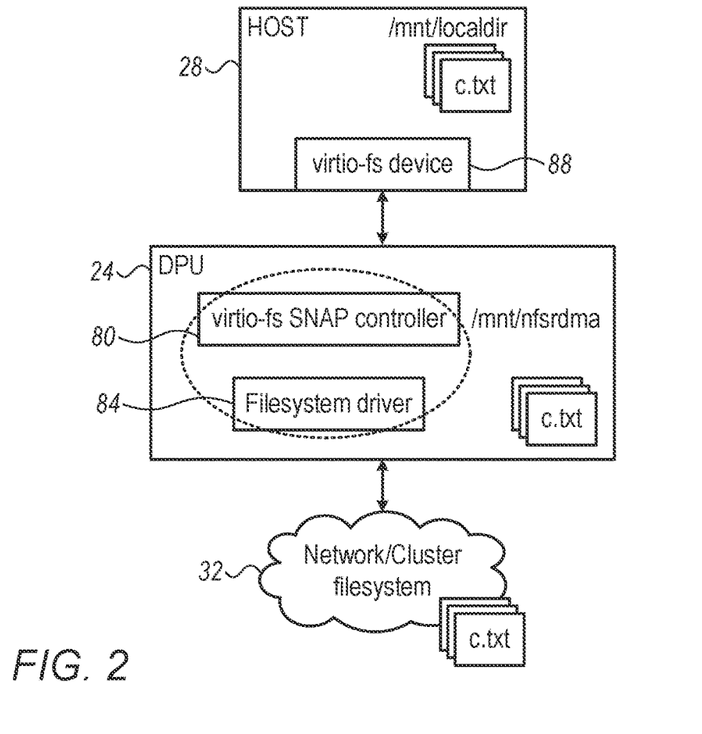
FIG. 2 is a block diagram that schematically illustrates an example use-case of filesystem emulation in the system of FIG. 1 above, in accordance with an embodiment of the present invention.

FIG. 2 is a block diagram that schematically illustrates an example use-case of filesystem emulation in system 20 of FIG. 1 above, in accordance with an embodiment of the present invention. In this embodiment, the bus storage protocol being emulated by DPU 24 is the Virtio-fs file system. Virtio-fs is a shared file system designed to serve Virtual Machines (VMs), and is described, for example, in Section 5.11 of "Virtual I/O Device (VIRTIO) Version 1.1," Committee Specification 01, Apr. 11, 2019.

In the example of FIG. 2, processing circuitry 56 of DPU 24 runs a virtio-fs SNAP controller 80 and a file system driver 84. Processing circuitry 56 exposes a dedicated virtio-fs PCIe device 88 to host 28. Driver 34 may be configured to interface with various types of networked, clustered or parallel file systems 32. Non-limiting examples of file systems include Lustre, GPFS, BeeGPFS, NFS (over TCP or over RDMA), or proprietary solutions offered by vendors such as Weka and Vastdata. Alternatively, any other suitable type of file system may be supported.

In an embodiment, Virtio-fs driver 88 presents to host 28 a local directory to mount, which is mapped to a directory in DPU 24. The protocol between DPU 24 and Virtio-fs driver 88 is defined in the virtio-fs specification, cited above, and is based on FUSE commands delivered over virtio-queues. In the more general case, virtio-fs SNAP controller 80 and file system driver 84 are tightly coupled to one another, and the virtio-fs folder presented to the host originates directly from the network without a local DPU folder representing it.

Figure 3:
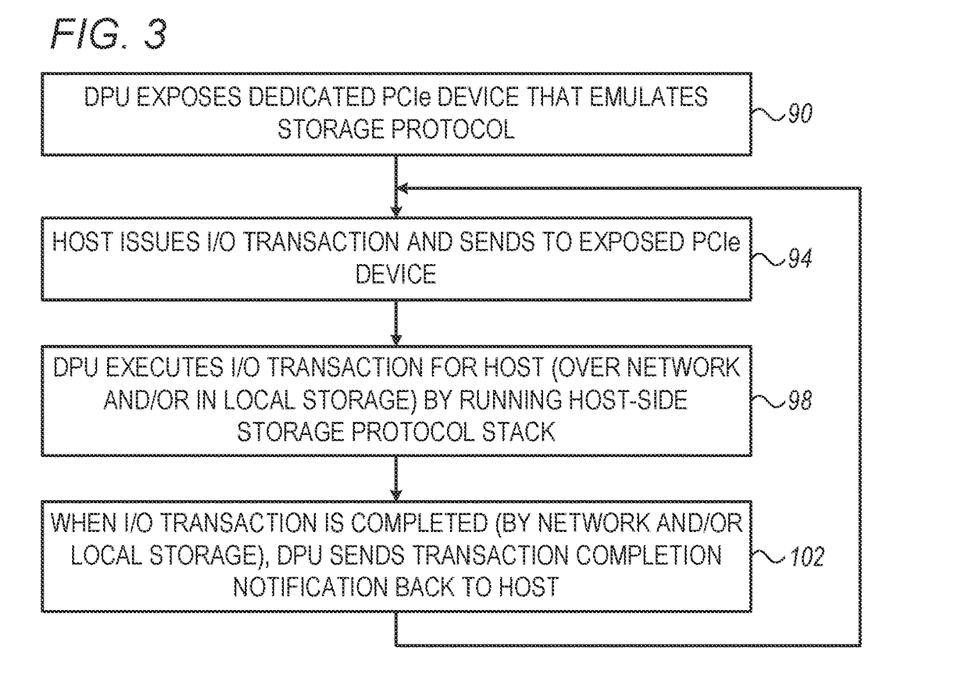
FIG. 3 is a flow chart that schematically illustrates a method for emulating a storage protocol in a peripheral device, in accordance with an embodiment of the present invention.

FIG. 3 is a flow chart that schematically illustrates a method for emulating a storage protocol in a peripheral device, in the present example DPU 24, in accordance with an embodiment of the present invention. The method begins with DPU 24 exposing to host 28 a dedicated PCIe device (e.g., device 62 of FIG. 1, or device 88 of FIG. 2) that presents a bus storage protocol, at an exposing step 90. At a transaction sending step 94, host 28 issues I/O transactions to the dedicated PCIe device.

At an I/O execution step 98, processing circuitry 56 of DEC 24 executes the I/O transactions for the host, in the appropriate storage system, in accordance with the network storage protocol. At a completion step 102, when the I/O transaction is completed, processing circuitry 56 of DPU 24 sends a completion notification to host 28.

Zero-Copy Completion of I/O Transactions

As can be appreciated, completing an I/O transaction by CPU 24 involves transfer of data between the memory of host 28 and a memory of the storage system managed by FS 32. When completing a write command, for example, processing circuitry 56 of DPU 24 transfers data from the memory of host 28 to the memory of the storage system. When completing a read command, processing circuitry 56 transfers data in the opposite direction, from the memory of the storage system to the memory of host 28.

In some embodiments, processing circuitry 56 performs these data transfers in a "zero-copy" manner. In the present context, the term "zero-copy" means that the data is transferred directly between the memory of host 28 to the memory of the storage system, without intermediate storage in DPU 24. Zero-copy completion of I/O transactions significantly reduces the overall transaction latency, and increases the achievable throughput.

Typically, the data transfer is performed using Remote Direct Memory Access (RDMA). In some embodiments, processing circuitry 56 performs zero-copy data transfer in two stages. In the first stage, processing circuitry 56 determines the appropriate address or addresses in the storage system for completing the I/O transaction (the address or addresses to which the data is to be written in case of a write command, or to be read from in case of a read command). Only then, in the second stage, processing circuitry 56 transfers the data between the appropriate addresses in the memory of host 28 and in the memory of the storage system.

In some embodiments, processing circuitry 56 performs zero-copy data transfer by accessing the memory of host 28 directly, using the host's own address space. Techniques of this sort are disclosed in U.S. patent application Ser. No. 17/189,303, entitled "Cross Address-Space Bridging," filed Mar. 2, 2021, whose disclosure is incorporated herein by reference. In an embodiment of this sort, processing circuitry 56 of DPU 24 creates an RDMA MKEY that describes a memory of host 28. In this manner, an RDMA operation can be performed directly between the memory of host 28 and the memory of the storage system (a network entity), eliminating the need for an extra copy to the DPU memory.

In alternative embodiments, processing circuitry 56 may perform zero-copy data transfer in any other suitable way.

Doorbells and Other DPU Hardware Mechanisms

In various embodiments, DPU 24 comprises various hardware or hardware-software mechanisms that enhance the flexibility of receiving and handling I/O transactions issued by host 28, and also reduces latency. Such mechanisms may comprise, for example, queues and corresponding doorbells, hardware registers, interrupts and the like. Several examples are given below.

Typically, host CPU 40 issues an I/O transaction by posting one or more work requests on a queue that can be read by processing circuitry 56 of DPU 24. The host and DPU may interact via multiple queues in parallel, e.g., a queue per host core, per application, per thread, per QoS class, per user or per tenant. In order to reduce latency, in some embodiments the host and the DPU use a doorbell mechanism, in which host processor 40 (i) signals to processing circuitry 56 that one or more work requests have been posted, and (ii) indicates the queue from which the DPU should read the work requests. Typically, the doorbell triggers hardware 60 in processing circuitry 52 to read the work requests from the specified queue and pass the work requests to CPUs 56 for processing.

In an example embodiment, hardware 60 is configured to regard one or more addresses on the PCIe Base Address Register (BAR) as doorbells. The BAR is exposed to the host via dedicated PCIe device 62. In this embodiment, host CPU 40 issues a doorbell by writing to one of these addresses. Such a write triggers hardware 60 in the DPU, which in turn reads any pending work requests from the specified queue.

Various techniques can be used for specifying the identity of the queue to be read. In one embodiment, a single BAR address is assigned to serve as a doorbell, and the host writes the appropriate queue identifier to this address. In another embodiment, each queue is assigned a respective different BAR address; any write to one of these BAR addresses is interpreted by hardware 60 as a doorbell for the corresponding queue. The value written to the address can be interpreted as the producer index of the queue. Alternatively, any other suitable mechanism or convention can be used.

In some embodiments, the DPU software, running on CPUs 56, is configured to issue a Message Signaled interrupt (MSI or MSI-X) to the host upon completing an I/O transaction. The interrupt triggers host CPU 40, and therefore reduces latency.

In some embodiments, CPUs 56 (in DPU 24) and host processor 40 (in host 28) are configured to exchange information and/or report events to one another by writing and reading registers defined on the PCIe bus BAR. These registers are exposed to the host via dedicated PCIe device 62. In some cases CPUs 56 (in DPU 24) write to a register and host processor 40 (in host 28) reads the register. In other cases host processor 40 (in host 28) writes to a register and CPUs 56 (in DPU 24) read the register. In some embodiments more complex register mechanisms can be defined. For example, writing to one register can affect the meaning of a subsequent write to another register.

In some embodiments, in exposing dedicated PCIe device 62, processing circuitry 52 is configured to emulate a "hot-plug" indication to host 28. The hot-plug indication notifies the host that a storage device has connected to PCIe bus 36.

Additional Embodiments and Variations

In some embodiments, as part of emulating the storage protocol to the host, processing circuitry 52 in DPU 24 is configured to emulate various FS services to host 28. Any suitable FS service can be emulated, such as, for example, directory services and statistics collection.

Additionally or alternatively, as part of emulating the storage protocol to the host, processing circuitry 52 in DPU 24 is configured to perform one or more storage virtualization and data manipulation operations. Storage virtualization operations that may be performed by DPU 24 comprise, for example, cryptographic operations such as encryption, decryption, signing and authentication, deduplication, mirroring, isolation for security, Quality of Service (QoS), directory service, locking, compression, Artificial Intelligence (AI) operations, among others. In some embodiments, such operations can be carried out, at least in part, by hardware 60 in processing circuitry 52, and/or accelerated by a Graphics Processing Unit (GPU) coupled to DPU 24.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
a host interface, configured to communicate with a host over a peripheral bus; and
processing circuitry, configured to:
expose on the peripheral bus a peripheral-bus device that communicates with the host using a bus storage protocol;
receive, using the exposed peripheral-bus device, Input/Output (I/O) transactions that are issued by the host; and
complete the I/O transactions for the host in accordance with a network storage protocol, by running at least part of a host-side protocol stack of the network storage protocol,
wherein, in running at least part of the host-side protocol stack, the processing circuitry is configured to isolate the host from control-plane operations of the network storage protocol.

2. The peripheral device according to claim 1, wherein the processing circuitry is configured to complete at least some, or at least part, of the I/O transactions for the host in a local storage.

3. The peripheral device according to claim 1, further comprising a network port configured to communicate over a network, wherein the processing circuitry is configured to complete at least some, or at least part, of the I/O transactions for the host by communicating over the network with a storage system that operates in accordance with the network storage protocol.

4. The peripheral device according to claim 3, wherein, in completing an I/O transaction over the network, the processing circuitry is configured to transfer data directly between a memory of the host and the storage system using zero-copy transfer.

5. The peripheral device according to claim 4, wherein the processing circuitry is configured to determine one or more addresses for the data in the storage system, and then to transfer the data directly between the one or more addresses and the memory of the host, without intermediate storage of the data in the peripheral device.

6. The peripheral device according to claim 1, wherein at least one of the bus storage protocol and the network storage protocol is a block storage protocol.

7. The peripheral device according to claim 1, wherein at least one of the bus storage protocol and the network storage protocol is a File-System (FS) protocol.

8. The peripheral device according to claim 1, wherein at least one of the bus storage protocol and the network storage protocol is an object storage protocol.

9. The peripheral device according to claim 1, wherein at least one of the bus storage protocol and the network storage protocol is a Key-Value (KV) protocol.

10. The peripheral device according to claim 1, wherein, in exposing the peripheral-bus device, the processing circuitry is configured to emulate a hot-plug indication, notifying the host that a storage device has connected to the peripheral bus.

11. The peripheral device according to claim 1, wherein the processing circuitry is configured to receive from the host a doorbell indicative of a queue on which the host posted one or more work requests pertaining to an I/O transaction, and to read and execute the one or more work requests so as to complete the I/O transaction.

12. The peripheral device according to claim 11, wherein the processing circuitry comprises hardware that is configured to receive the doorbell and to read the one or more work requests from the queue in response to the doorbell.

13. The peripheral device according to claim 1, wherein the processing circuitry is configured to issue a Message Signaled Interrupt to the host upon completing an I/O transaction.

14. The peripheral device according to claim 1, wherein the processing circuitry is configured to communicate with the host via one or more registers exposed on the peripheral bus.

15. The peripheral device according to claim 1, wherein the processing circuitry is further configured to perform one or more of storage virtualization and data manipulation operations.

16. A method, comprising:
in a peripheral device that communicates with a host over a peripheral bus, exposing on the peripheral bus a peripheral-bus device that communicates with the host using a bus storage protocol;

receiving in the peripheral device, using the exposed peripheral-bus device, Input/Output (I/O) transactions that are issued by the host; and completing the I/O transactions for the host, by the peripheral device, in accordance with a network storage protocol, by running at least part of a host-side protocol stack of the network storage protocol, wherein running at least part of the host-side protocol stack comprises isolating the host from control-plane operations of the network storage protocol.

17. The method according to claim 16, wherein completing the I/O transactions comprises completing at least some, or at least part, of the I/O transactions for the host in a local storage.

18. The method according to claim 16, wherein completing the I/O transactions comprises completing at least some, or at least part, of the I/O transactions for the host by communicating over a network with a storage system that operates in accordance with the network storage protocol.

19. The method according to claim 18, wherein completing an I/O transaction over the network comprises transferring data directly between a memory of the host and the storage system using zero-copy transfer.

20. The method according to claim 19, wherein transferring the data comprises determining one or more addresses for the data in the storage system, and then transferring the data directly between the one or more addresses and the memory of the host, without intermediate storage of the data in the peripheral device.

21. The method according to claim 16, wherein at least one of the bus storage protocol and the network storage protocol is a block storage protocol.

22. The method according to claim 16, wherein at least one of the bus storage protocol and the network storage protocol is a File-System (FS) protocol.

23. The method according to claim 16, wherein at least one of the bus storage protocol and the network storage protocol is an object storage protocol.

24. The method according to claim 16, wherein at least one of the bus storage protocol and the network storage protocol is a Key-Value (KV) protocol.

25. The method according to claim 16, wherein exposing the peripheral-bus device comprises emulating a hot-plug indication, notifying the host that a storage device has connected to the peripheral bus.

26. The method according to claim 16, wherein receiving the I/O transactions comprises receiving from the host a doorbell indicative of a queue on which the host posted one or more work requests pertaining to an I/O transaction, and wherein completing the I/O transactions comprises reading and executing the one or more work requests.

27. The method according to claim 26, wherein receiving the doorbell comprises receiving the doorbell, and read the one or more work requests from the queue in response to the doorbell, using hardware.

28. The method according to claim 16, wherein completing the I/O transactions comprises issuing a Message Signaled Interrupt to the host upon completing an I/O transaction.

29. The method according to claim 16, wherein exposing the peripheral-bus device comprises communicating with the host via one or more registers exposed on the peripheral bus.

30. The method according to claim 16, wherein running at least part of the host-side protocol stack comprises performing one or more of storage virtualization and data manipulation operations.

* * * * *